Patented Jan. 26, 1926.

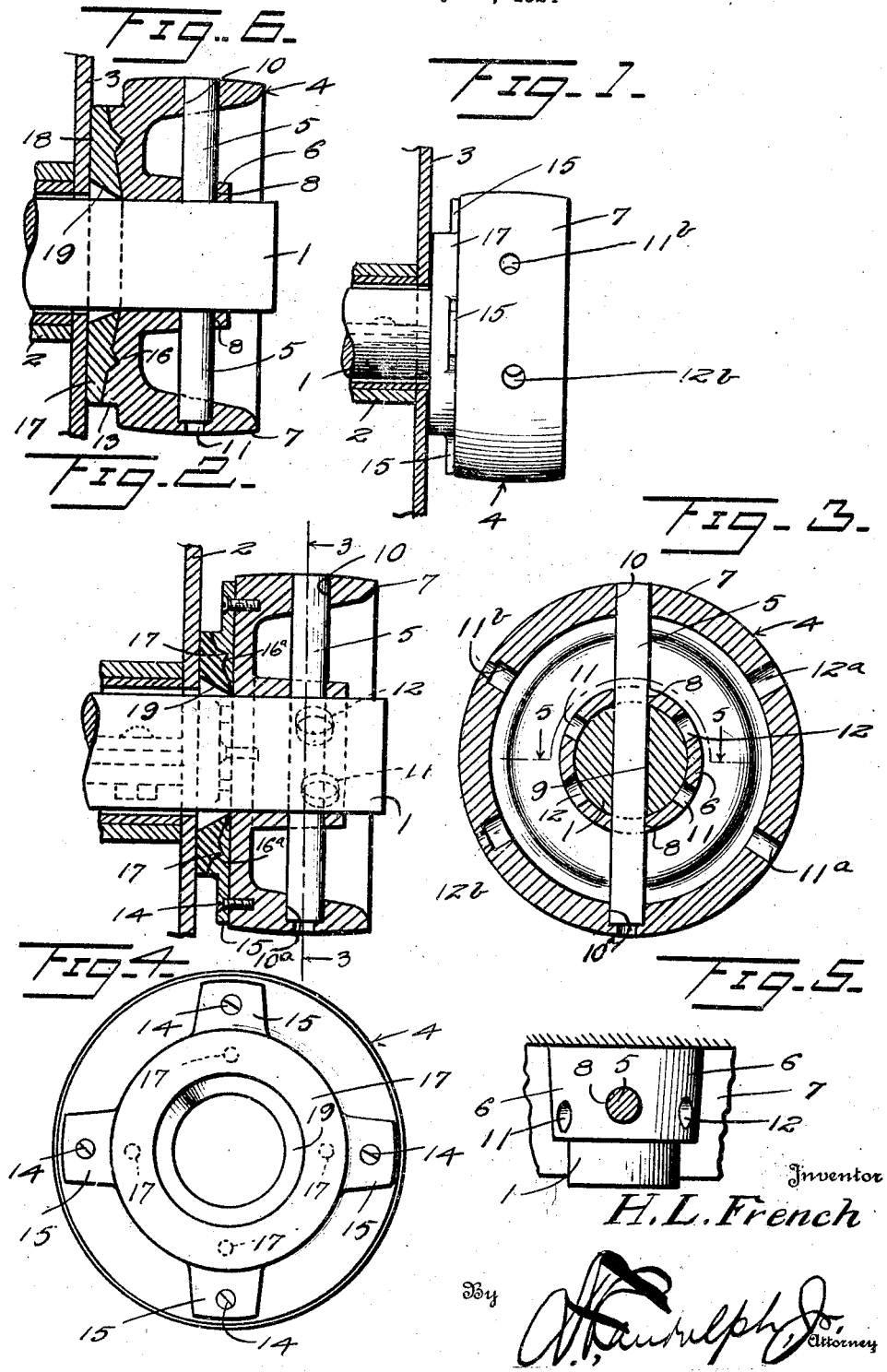

1,571,047

UNITED STATES PATENT OFFICE.

HAMMAN L. FRENCH, OF PIEDMONT, TENNESSEE.

ADJUSTABLE FAN-BELT PULLEY.

Application filed May 10, 1924. Serial No. 712,302.

*To all whom it may concern:*

Be it known that I, HAMMAN L. FRENCH, a citizen of the United States, residing at Piedmont, in the county of Jefferson and State of Tennessee, have invented certain new and useful Improvements in Adjustable Fan-Belt Pulleys; and I do hereby declare the following to be a full, clear, and exact description of the invention, such as will enable others skilled in the art to which it appertains to make and use the same.

This invention relates to improvements in automobile and tractor power plants of that type embodying a planetary transmission, a service brake associated with the crank shaft of the engine, pedal actuated bands associated with the drums of the transmission and brake, and a magneto of which the field magnets are secured to the fly wheel of the engine and the armature coils arranged on a plate in an annular series about the field magnets. It is well known that in power plants of this kind, a certain amount of wear in the crank shaft bearings permits an endwise displacement in a rearward direction of the crank shaft, with the result that the transmission and brake drums are thown out of alinement with the pedal actuated bands, the field magnets thrown out of alinement with the armature coils, and the pistons thrown out of alinement with the cylinders. When these conditions exist, the engine cannot be readily started, the service brake and transmission cannot be controlled to the best advantage, and the piston and cylinder walls wear unevenly. To remedy these conditions, it is now the practice to remove the engine and either replace the crank shaft bearing or restore the crank shaft to its proper position and secure it in such a position by a shim contacting with the rear side of the plate carrying the armature coils, after which the engine is replaced. To remedy the stated conditions by either of these methods involves considerable expense, time and labor.

The primary object of my invention is the provision of novel and simple means by which the stated conditions may be remedied without removing the engine so as to permit the work to be done in a comparatively short time and at comparatively little expense, and to attain this end I provide a fan driving pulley which is adapted to be secured to the crank shaft in contact with the engine block after the crank shaft has been restored to its proper position, the pulley, due to its contact with the engine block, holding the crank shaft in its restored position.

With the above and other objects in view, the invention consists in the construction, combination and arrangement of parts hereinafter fully described and claimed, and illustrated in the accompanying drawing, wherein:

Figure 1 is a view in side elevation of a fan driving pulley embodying my invention, the pulley being shown in applied position and the adjacent portion of the engine block being shown in vertical section, Figure 2 is a sectional view taken on a vertical plane extending centrally through the parts shown in Figure 1, Figure 3 is a sectional view taken on the vertical plane indicated by the line 3—3 of Figure 2, Figure 4 is a detail view in rear elevation of the pulley, Figure 5 is a detail sectional view taken on the line 5—5 of Figure 3, and Figure 6 is a view similar to Figure 2 of a slightly modified form of the pulley.

Referring to the drawing by reference numerals, 1 designates the front portion of a crank shaft, 2 the front crank shaft bearing, 3 a portion of the block, and 4 the fan driving pulley of an engine of the character hereinbefore pointed out. The pulley 4 is secured to the crank shaft 1 by the starting pin 5, and it comprises a hub 6 and a rim 7. The hub 6 and crank shaft 1 are provided with registering openings 8 and 9, respectively, for the reception of the starting pin 5. To permit the application and removal of the starting pin 5, the rim 7 is provided with an opening 10. In order to receive one end of and permit the starting pin 5 to be driven out through the opening 10 by means of a rod or punch and hammer when it is desired to remove the pulley 4, the rim 7 is provided at a point diametrically opposite the opening 10 with an opening 10ª the outer end of which is of reduced diameter.

In accordance with my invention, the pulley 4 is mounted on the crank shaft 1 for axial adjustment with respect thereto so as to permit it to be moved into contact with the engine block 3 after the crank shaft 1 has been restored to its proper position to remedy the hereinbefore stated conditions, to the end that the crank shaft may be maintained in its proper position. To permit it to be adjusted in the manner stated, the pulley 4 is provided in its hub 6 and rim 7 with radially alined openings 11 and 11ª and with radially alined openings 12 and 12ª. The series of openings 8 and 10, 11 and 11ª, and 12 and 12ª, are respectively arranged in relatively spaced radial planes. The openings 11 and 11ª are arranged in a plane in advance of the openings 8 and 10, and the openings 12 and 12ª are arranged in a plane in advance of the openings 11 and 11ª. Due to this arrangement of the respective series of openings, the pulley 4 may be adjusted rearwardly on the crank shaft 1 and secured in adjusted position by the starting pin 5. In adjusting the pulley 4 from its initial position, in which position the openings 8 and 10 are in alinement with the opening 9 and the starting pin 5 passes through the openings 8 and 9, the openings 11 and 11ª or the openings 12 and 12ª are alined with the opening 9 so as to permit the pulley to be secured in adjusted position by the starting pin. In alinement with the openings 11 and 11ª, the rim 7 is provided with an opening 11ᵇ, and in alinement with the openings 12 and 12ª, the rim is provided with an opening 12ᵇ. The outer ends of the openings 11ᵇ and 12ᵇ are of reduced diameter, and these openings are provided for the purpose of receiving one end of and permitting the starting pin 5 to be driven out through either the opening 11ª or the opening 12ª. As the ends of the starting pin 5 are embedded in the rim 7 of the pulley 4, the pin cannot be bent during the cranking of the engine and it prevents undue strain from being placed upon the hub 6 during the operation of the engine.

The pulley 4 is provided at its rear side with a boss 13 which, as shown in Figures 1, 2 and 4 may be made separately and secured in place by screws 14, or which, as shown in Figure 6 may be formed integrally with the pulley. When made separately, the boss 13 is provided with ears 15 through which the screws 14 pass. In its rear side, the boss 13 is provided with a conical recess 16 for the reception of a washer 17 which is preferably made of Babbitt metal and which is provided with a conical front side 18 engaging the wall of the conical recess 16. The opening through the washer 17 for the reception of the crank shaft 1, is of conical formation to provide in conjunction with the adjacent part of the crank shaft 1 and engine block 3 an oil groove 19 which receives oil from the lubricating system of the engine and from which the oil flows between the contacting sides of the washer 17 and engine block 3 and reduces the friction between these parts to the minimum. The wall of the recess 16 is provided with sockets 16ª for the reception of portions of the washer 17 so as to prevent rotary movement of the washer with respect to the pulley 4.

In practice, the pulley 4, due to the contact of the washer 17 with the engine block 3, prevents the endwise displacement in a rearward direction of the crank shaft 1. Should, however, the washer 17 and crank shaft bearings wear sufficiently to permit the stated displacement of the crank shaft 1, the latter may be restored to its proper position and secured in such position without removing the engine. To accomplish this, it is only necessary to pull the crank shaft forwardly with respect to the engine, then adjust the pulley 4 upon the crank shaft 1 until it contacts with the engine block 3, and thence secure the pulley 4 in adjusted position by the starting pin 5.

From the foregoing description, taken in connection with the accompanying drawing, it should be apparent that I provide simple and effective means for holding the crank shaft of an engine against endwise displacement in a rearward direction, that the means permits a displaced crank shaft to be restored to its proper position in a comparatively short time and in a simple manner, and that the means permits a restored crank shaft to be maintained in proper position without the use of shims or new bearings. My improved pulley may be readily substituted for the stock pulley of power plants of the character hereinbefore stated, it may be made in different sizes, it may be made of any suitable material, and it may be provided with any number of series of openings.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A pulley of the character set forth provided with axially spaced series of radially alined openings and with a boss provided with a conical recess, and a washer provided with a conical front side entering said recess.

2. A pulley of the character set forth provided with means by which it may be adjustably secured to a crank shaft, and provided with a boss having a conical recess, and a washer having a conical side entering said recess and provided with a conical crank shaft receiving opening.

3. A fan belt pulley provided at its rear side with a conical recess having sockets in the bottom wall thereof, and a washer provided with a conical front side entering said recess and said side of the washer having projections entering said sockets.

4. In combination, a crank shaft provided with a diametrical opening, a pulley mounted on the shaft and provided with axially spaced series of radially alined openings, and a pin passing through the opening in the crank shaft and a selected series of the openings in the pulley, the axial spacing of the openings in the pulley permitting it to be adjusted on and longitudinally of the crank shaft.

In testimony whereof I affix my signature.

HAMMAN L. FRENCH.